June 27, 1933. W. H. HAUG 1,915,528
METHOD OF MAKING PLASTIC CANDY UNITS
Filed Feb. 4, 1930 2 Sheets-Sheet 1
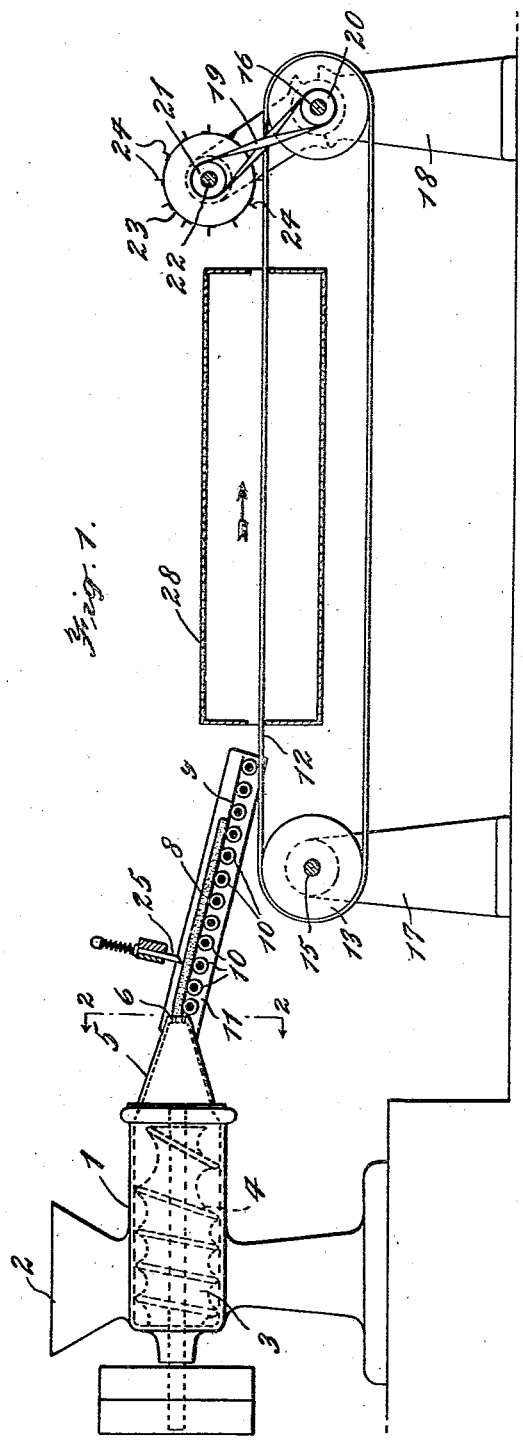
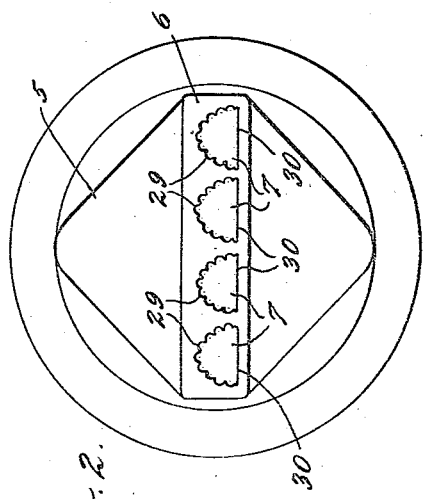
INVENTOR
Waldemar H. Haug
BY
Gustav Drews
ATTORNEY June 27, 1933.   W. H. HAUG   1,915,528
METHOD OF MAKING PLASTIC CANDY UNITS
Filed Feb. 4, 1930   2 Sheets-Sheet 2
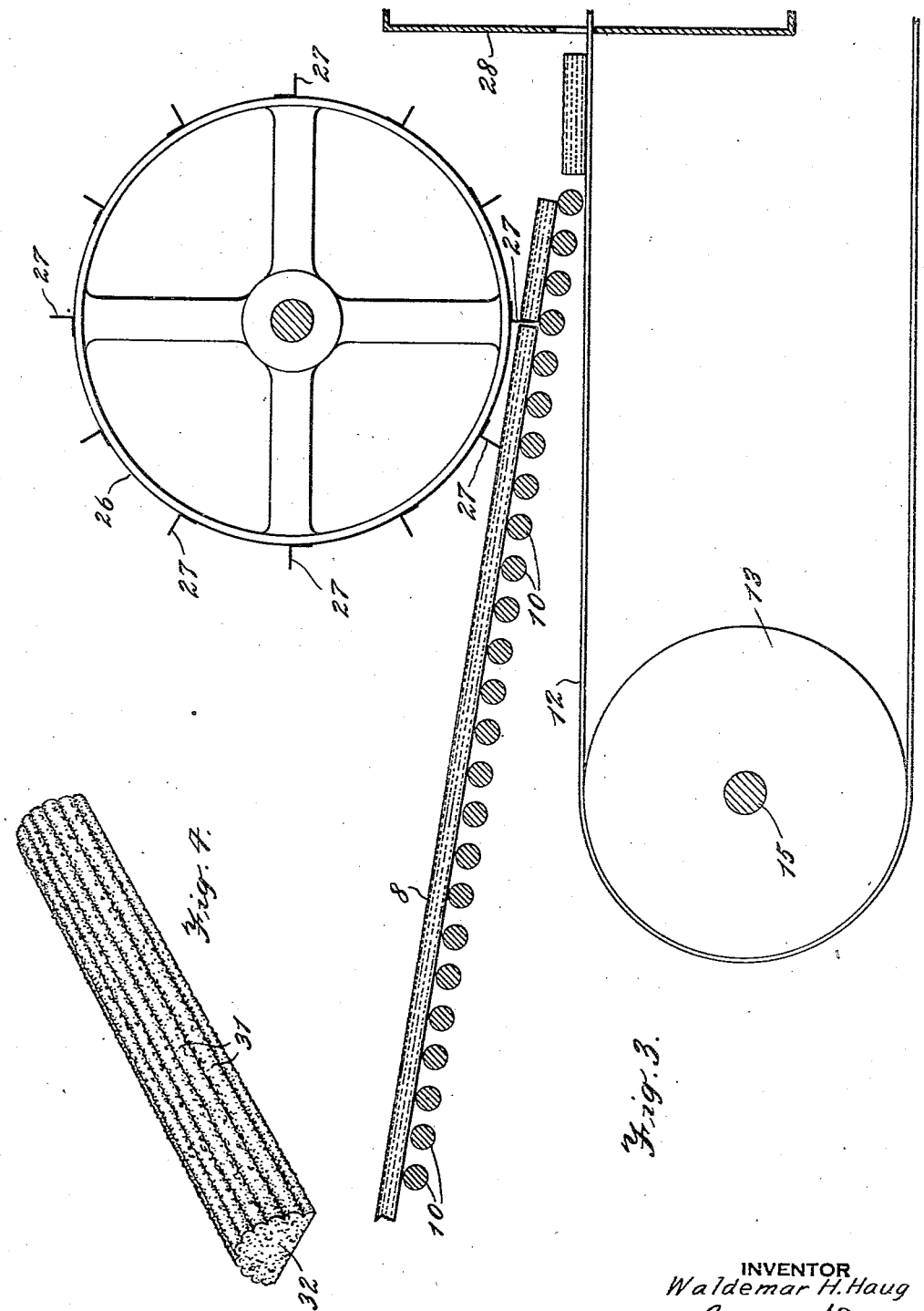
INVENTOR
Waldemar H. Haug
BY
ATTORNEY Patented June 27, 1933

1,915,528

UNITED STATES PATENT OFFICE

WALDEMAR H. HAUG, OF BROOKLYN, NEW YORK, ASSIGNOR TO MASON, AU & MAGENHEIMER CONFECTIONERY MANUFACTURING COMPANY, OF BROOKLYN, NEW YORK A CORPORATION OF WEST VIRGINIA

METHOD OF MAKING PLASTIC CANDY UNITS

Application filed February 4, 1930. Serial No. 425,734.

This invention relates to an improved method for making a candy composed of a plastic mass and also to an improved machine used in such method.

Among the main objects of the present invention it is aimed to provide an improved method for making a candy composed of a plastic mass having associated therewith nut particles such as peanut particles, walnut particles and the like.

Heretofore considerable difficulty has been encountered in producing candies composed of a plastic mass associated with nut particles which will retain a predetermined amount of moisture so as to maintain the candy in a so-called fresh state, and in addition thereto, preserve the nut particles from deterioration. To this end, the present invention aims to provide an improved process or method for making a plastic mass of candy associated with nut particles which will effectively retain a predetermined amount of moisture so that the candies after manufacture may without danger be kept in a store house or in a retail store for several months without losing their fresh state and without any danger of deterioration to the nut particles.

It is still another object of the present invention to provide an improved machine to be used with this improved process whereby with facility the plastic mass can be finally mixed and formed into units.

These and other features, capabilities and advantages of the invention will appear from the subjoined detail description of embodiments thereof illustrated in the accompanying drawings in which Figure 1 is a side elevation of a machine for carrying out part of the process constituting my invention;

Fig. 2 is an enlarged end elevation on the line 2—2 of Fig. 1;

Fig. 3 is a side elevation of a modified cutting device which may be used with the embodiment illustrated in Figs. 1 and 2; and Fig. 4 is a perspective of a candy unit made according to the present invention.

In the process of the present invention, it is desirable to form a fondant, a cream egg and a nut mixture, and thereupon mix these three main mixtures at a comparatively low temperature, practically in the cold state, in a dough mixer or the like at room temperature without any cooking or the application of any additional heat.

Good results have been obtained by using the ordinary fondant prepared from granulated sugar and corn syrup. Good results have also been obtained in using the ordinary cream egg prepared from corn syrup, invert sugar syrup and a solution of egg albumen.

When using such ordinary fondants and ordinary cream egg, however, it has been found desirable to exercise particular caution in the preparation of the nut particles. As an instance, it has been found desirable that the nut particles be not ground too fine but simply fine enough to pass through a disc having holes three-sixteenths of an inch in diameter and to use nut particles which have been previously oil roasted such as oil roasted Spanish peanuts. After these three main mixtures have been prepared as aforesaid, it is then desirable to mix them together in an ordinary dough mixture with ordinary table salt, to wit, sodium chloride, in the following proportions: thirty-two parts by weight of the nut particles, one part by weight of the sodium chloride, sixty-four parts by weight of the fondant, and three parts by weight of the cream egg. Furthermore, the best results have been obtained when the fondant and cream egg are added to the nut mixture when they are in a practically cold state at ordinary room temperature.

In view of the fact that these three mixtures with the salt are introduced into the dough mixture in a comparatively cold state, it is of course obvious that the process may stop at any time and be resumed after an interval of time without danger of clogging the mixer. Consequently, it is not necessary to clean the mixer at the end of a day's operation but instead, when necessary, permit the same to remain in the mixer over night and resume operation the following morning or several days thereafter according to requirements.

The present process also has the advantage that the final mixture after leaving the dough mixer may be shipped to a distant point, as for instance from a central plant to a smaller plant, there to be formed into bars or the like. When forming the final mixture into candy units such as bars and the like, good results have been obtained with the apparatus illustrated in the accompanying drawings.

The final mixture is introduced to the extruding machine 1 having a hopper 2, a cylindrical body 3 and a feeding screw 4 which feeds the final mixture from the funnel-shaped discharge cone 5 to the die plate 6, see Fig. 2, having the die openings 7 in the present instance, from which die openings 7 the streams of candy 8 pass onto removable supports such as oiled sheets of paper 9 resting on the rollers 10 on the inclined platform 11.

Due to the momentum of the streams 8 as they emerge from the die plate 7, and assisted by the inclined row of rollers 10, the streams 8 advance to the conveyor 12 mounted on the pulleys 13 and 14 fixed on the shafts 15 and 16 journaled in suitable supports 17 and 18. The conveyor 12, in the present instance, is driven by the belt 19 which connects the hub 20 of the shaft 16 with the hub 21 of the shaft 22 connected to a suitable source of power, not shown.

On the shaft 22 a cutting wheel 23 may be mounted having the cutting knives 24 formed thereon. As the streams 8 emerge from the die plate 6, they may be severed into units by any suitable cutter, such for instance as the manually controlled cutting knife 25 or the rotatable cutter 26 having the knives 27 along its periphery. The rotatable cutter 26, as appears from Fig. 3, need not be positively driven but will likewise be advanced by the movement of the streams 8 as they advance along the rollers 10.

The conveyor 12, as appears from Fig. 1, in the present instance, is used to pass the streams 8 or units of candy through a cooling chamber formed by the housing 28 which may be cooled by any suitable well-known means.

The die openings 7, in the present instance, are indicated as having corrugated cone-shaped upper surfaces 29 and plain lower surfaces 30, and of course the shape of the candies will be determined by the shape of these die openings 7. The die plates 6 are readily removable from the discharge hood 5 so that die plates having different shaped openings may be provided according to the requirements.

The row of inclined rollers 10 operating as they do as a result of the momentum of the streams 8, and the rotary cutter 26 operating as it does as a result of the momentum of the streams 8, cooperate to preserve the initial form or shape given to the candy stream by the die openings 7. It is believed that this is due to the fact that the difference in pressure between the atmosphere and that in the container, tends to cause the streams to swell or expand as they emerge from the die openings 7. This expansion or swelling of course takes place in every direction, longitudinally as well as laterally. If the streams were received on a power-driven conveyor or were permitted to be suspended in the air before being passed onto a support, this longitudinal expansion of the streams would be materially facilitated. However, as a result of the retarding action of the inclined row of rollers 10 and rotary cutter 26, the expansion is limited in a longitudinal direction and takes place only in a lateral direction, resulting in a candy contour that is particularly unique as illustrated in Fig. 4. This candy contour, especially when formed with the rows 31 of the unit 32 shown in Fig. 4, is particularly attractive and is being very favorably received by the candy eating public.

It is obvious that various changes and modifications may be made in the steps of the process and also to the details of the apparatus used without departing from the general spirit of the invention as set forth in the appended claim.

I claim:

The process of fabricating candy units condensed in a longitudinal direction but expanded in a lateral direction while in the cold state from a readily compressible plastic mass having a natural fluffy inner texture consisting in exercising a pressure greater than atmosphere on a portion of the mass while extruding it in to a plurality of streams, thereupon advancing the streams so formed under their own extruding momentum and permitting them freely to expand in a lateral direction in conformity with the room or atmospheric pressure but retarding their expansion in a longitudinal direction, and thereupon cutting the streams into units.

WALDEMAR H. HAUG.